US012627326B2

(12) United States Patent　　　　(10) Patent No.:　US 12,627,326 B2
Miller et al.　　　　　　　　　　　　(45) Date of Patent:　May 12, 2026

(54) REMOTE POWER CONTROL BOX

(71) Applicant: L3Harris Technologies, Inc.,
Melbourne, FL (US)

(72) Inventors: Brandon J. Miller, Greenville, TX
(US); Roy Mark Osborn, Alba, TX
(US); Khanh Vo, Garland, TX (US)

(73) Assignee: L3Harris Technologies, Inc.,
Melbourne, FL (US)

( * ) Notice: Subject to any disclaimer, the term of this
patent is extended or adjusted under 35
U.S.C. 154(b) by 399 days.

(21) Appl. No.: 18/240,471

(22) Filed: Aug. 31, 2023

(65) Prior Publication Data

US 2025/0080148 A1　　　Mar. 6, 2025

(51) Int. Cl.
　　*H04B 1/16*　　　　　(2006.01)
　　*H01Q 1/24*　　　　　(2006.01)
　　*H01Q 21/30*　　　　(2006.01)
(52) U.S. Cl.
　　CPC ........... *H04B 1/1615* (2013.01); *H01Q 1/246*
　　　　　　(2013.01); *H01Q 21/30* (2013.01)
(58) Field of Classification Search
　　CPC ........ B60R 25/045; H04W 4/80; H04W 4/02;
　　　　　　H04W 4/38; H04L 67/02; H04L 67/12;
　　　　　　H04L 9/50; Y02D 30/70; H01M 10/48;
　　　　　　H01M 10/425; H01M 2010/4278; H01M
　　　　　　2220/20; G01R 31/3644; G01R 31/392;
　　　　　　G01R 31/382; B60L 2240/70; B60L
　　　　　　3/0046; B60L 53/80; B60L 58/10; B60L
　　　　　　58/12; B60L 58/16; B60L 3/12; H04B
　　　　　　1/1615; H01Q 1/246; H01Q 21/30; H02J
　　　　　　　　　　　　　　　　13/00036
　　See application file for complete search history.

(56) References Cited

U.S. PATENT DOCUMENTS 5,461,262　A　*　10/1995　Hirasawa ................ B60R 16/04
　　　　　　　　　　　　　　　　　　　　　320/125
9,711,868　B2 *　7/2017　Scheucher ......... H04B 7/15557
　　　　　　　　　　(Continued)

FOREIGN PATENT DOCUMENTS

WO　　　2022/243741　A1　　11/2022

OTHER PUBLICATIONS

"TELEswitch Wireless Switch Control", Ritron Wireless Solutions,
www.ritron.com, P/N 14610042, Rev B, Oct. 2008, 2 pages.

(Continued)

*Primary Examiner* — Cindy Trandai
(74) *Attorney, Agent, or Firm* — Edell, Shapiro & Finnan,
LLC

(57)　　　　　　ABSTRACT

An apparatus comprises: a case enclosing a space; a power
connector, extending through the case, to be connected to an
external device; a power switch, retained in the space, and
configured to be controlled responsive to commands in a
UHF/VHF radio signal received by the power switch; a
battery, retained in the space, having battery terminals
connected to the power connector such that at least one of
the battery terminals is connected to the power connector
through the power switch; and an antenna, mounted to the
case, to receive, and deliver to the power switch, the
UHF/VHF radio signal, wherein the commands include a
first command to close the power switch to connect the
battery to the external device, and a second command to
open the power switch to disconnect the battery from the
external device.

18 Claims, 5 Drawing Sheets

(56)          References Cited

U.S. PATENT DOCUMENTS

| | | | |
|---|---|---|---|
| 10,326,178 B2 * | 6/2019 | Toya | H01M 50/204 |
| 2003/0006879 A1 * | 1/2003 | Kang | G08B 13/189 |
| | | | 340/5.61 |
| 2007/0184814 A1 | 8/2007 | Hamilton | |
| 2007/0285056 A1 * | 12/2007 | Yoon | G06F 1/263 |
| | | | 320/116 |
| 2008/0213652 A1 * | 9/2008 | Scheucher | B60L 8/003 |
| | | | 429/97 |
| 2009/0256674 A1 | 10/2009 | Lee et al. | |
| 2011/0133912 A1 * | 6/2011 | Tesman | B60R 25/045 |
| | | | 340/426.12 |
| 2011/0300728 A1 | 12/2011 | Katagiri et al. | |
| 2012/0274276 A1 | 11/2012 | Endo | |
| 2014/0111119 A1 * | 4/2014 | Ostrovsky | H05B 39/083 |
| | | | 323/234 |
| 2016/0303990 A1 * | 10/2016 | Penilla | B60L 53/80 |
| 2018/0170202 A1 | 6/2018 | Kim | |
| 2018/0316815 A1 * | 11/2018 | Douthat | G06F 1/28 |
| 2020/0006022 A1 * | 1/2020 | Kowalik | H01H 33/20 |
| 2020/0052526 A1 * | 2/2020 | Ueda | H02J 50/10 |
| 2020/0152940 A1 * | 5/2020 | Butterfield | H01M 50/204 |
| 2020/0175551 A1 * | 6/2020 | Penilla | B60L 53/80 |
| 2020/0215930 A1 | 7/2020 | Izumi | |
| 2020/0235607 A1 * | 7/2020 | Kanarellis | G06F 13/4068 |
| 2021/0343170 A1 * | 11/2021 | Meier | G05D 1/0808 |
| 2022/0217517 A1 * | 7/2022 | Daoura | H04W 4/80 |
| 2022/0416572 A1 * | 12/2022 | Hittle | H02J 7/34 |
| 2023/0403042 A1 * | 12/2023 | Ross | H04B 1/40 |
| 2025/0145164 A1 * | 5/2025 | Ono | G01R 31/387 |

OTHER PUBLICATIONS

Extended European Search Report in European Application No. 24193419.9, dated Feb. 7, 2025, 9 pages.

* cited by examiner

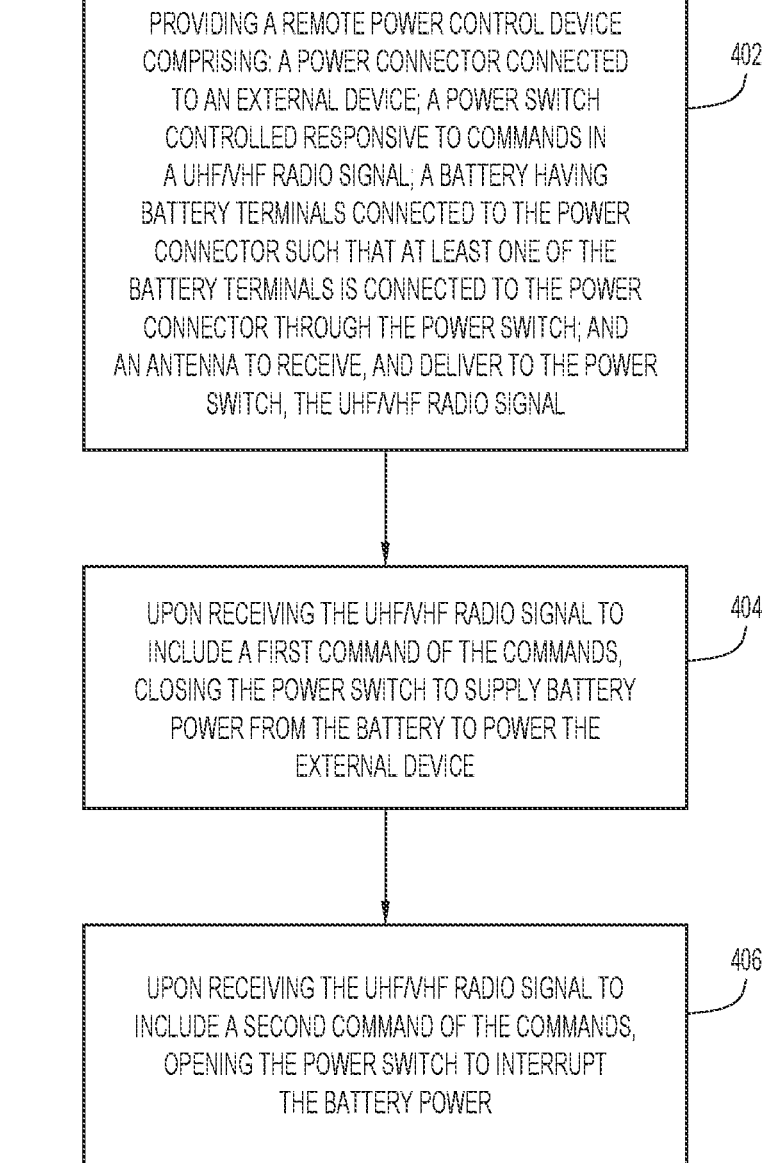

400

PROVIDING A REMOTE POWER CONTROL DEVICE COMPRISING: A POWER CONNECTOR CONNECTED TO AN EXTERNAL DEVICE; A POWER SWITCH CONTROLLED RESPONSIVE TO COMMANDS IN A UHF/VHF RADIO SIGNAL; A BATTERY HAVING BATTERY TERMINALS CONNECTED TO THE POWER CONNECTOR SUCH THAT AT LEAST ONE OF THE BATTERY TERMINALS IS CONNECTED TO THE POWER CONNECTOR THROUGH THE POWER SWITCH; AND AN ANTENNA TO RECEIVE, AND DELIVER TO THE POWER SWITCH, THE UHF/VHF RADIO SIGNAL

402

UPON RECEIVING THE UHF/VHF RADIO SIGNAL TO INCLUDE A FIRST COMMAND OF THE COMMANDS, CLOSING THE POWER SWITCH TO SUPPLY BATTERY POWER FROM THE BATTERY TO POWER THE EXTERNAL DEVICE

404

UPON RECEIVING THE UHF/VHF RADIO SIGNAL TO INCLUDE A SECOND COMMAND OF THE COMMANDS, OPENING THE POWER SWITCH TO INTERRUPT THE BATTERY POWER

REMOTE POWER CONTROL BOX

TECHNICAL FIELD

The present disclosure relates generally to a remote power control box used to provide battery power to a battery powered device.

BACKGROUND

Mobile ad hoc networking (MANET) radios may be scattered physically across an expansive, remote, geographical region to form a wireless mesh network that provides wireless network coverage across the geographical region. To operate, the MANET radios may rely on built-in power and communication infrastructures that offer power sources and hardwired or wireless communication networks; however, the geographical region may lack such infrastructures. Moreover, the radios may be exposed to harsh environments and may remain unattended for long periods of time.

BRIEF DESCRIPTION OF THE DRAWINGS

FIG. 4 is a flowchart of an example method of using an RPC box to selectively provide battery power to an external device that can be powered by the battery power.

DESCRIPTION

Overview

In an embodiment, an apparatus comprises: a case enclosing a space; a power connector, extending through the case, to be connected to an external device; a power switch, retained in the space, and configured to be controlled responsive to commands in a UHF/VHF radio signal received by the power switch; a battery, retained in the space, having battery terminals connected to the power connector such that at least one of the battery terminals is connected to the power connector through the power switch; and an antenna, mounted to the case, to receive, and deliver to the power switch, the UHF/VHF radio signal, wherein the commands include a first command to close the power switch to connect the battery to the external device, and a second command to open the power switch to disconnect the battery from the external device.

Example Embodiments

Figure 1:
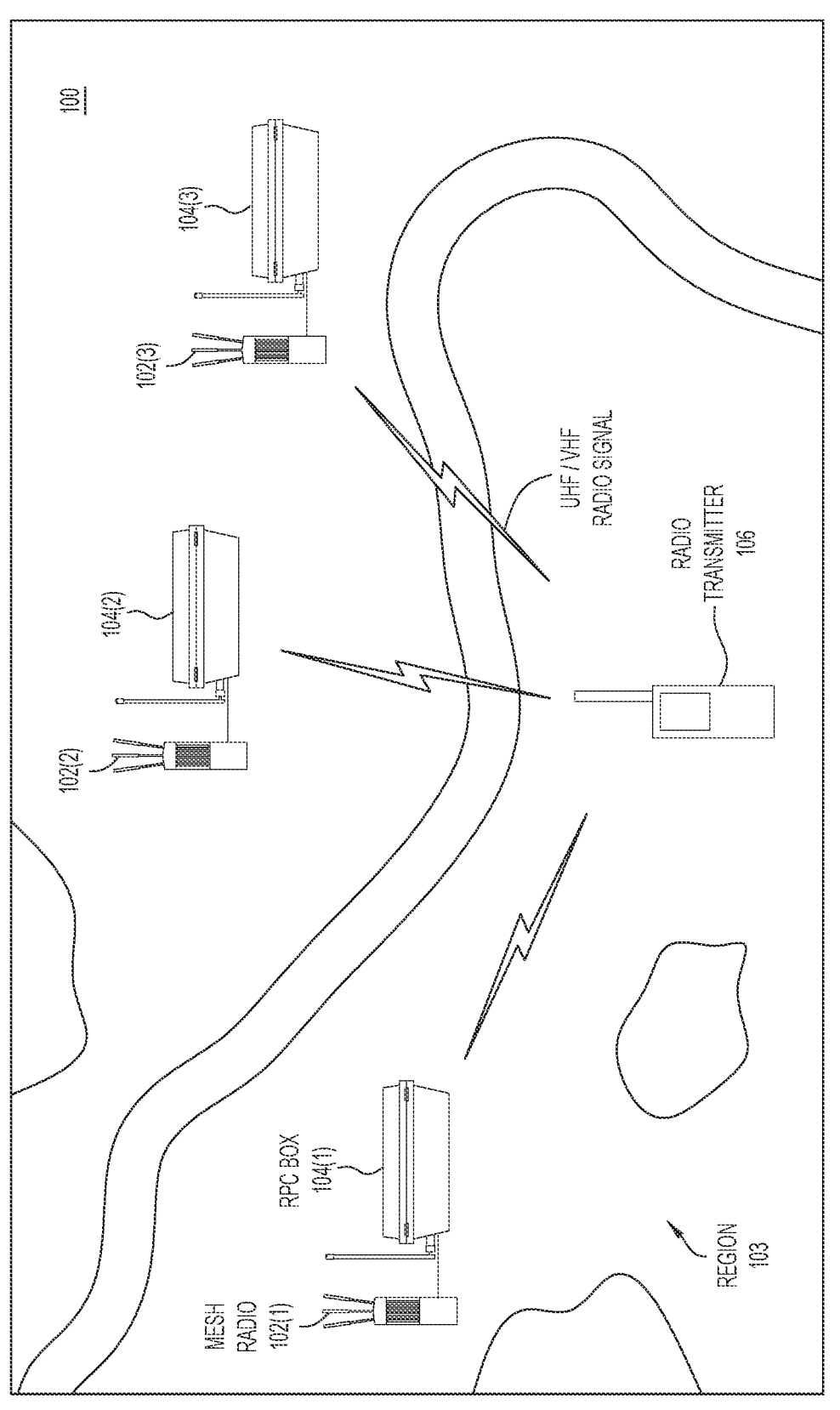
FIG. 1 is an illustration of an example system that uses remote power control (RPC) boxes to provide battery power to radio devices.

Embodiments presented herein are directed to a remote power control (RPC) box configured to provide battery power to an end user device (EUD) that is connected to the RPC box through a battery power cable and that operates off of the battery power. The embodiments are described in connection with a battery powered radio as the EUD that receives the battery power from the RPC, by way of example. It is understood that the EUD may be any battery powered device. FIG. 1 is an illustration of an example system 100 that uses remote power control boxes to provide battery power to network radios, according to embodiments presented herein. System 100 includes mesh radios 102(1)-102(3) (collectively referred to as "mesh radios 102" and also referred to more generally as "network radios") deployed across a geographical region 103. Mesh radios 102 are configured to operate on battery power. Once operating, mesh radios 102 intercommunicate to form a mesh network across geographical region 103. Geographical region 103 may lack a built-in power infrastructure that can supply power to mesh radios 102 and may also lack a communication infrastructure, such as WiFi, cellular, Ethernet, and the like, to support communications with the mesh radios.

Accordingly, system 100 further includes RPC boxes 104(1)-104(3) (collectively referred to as "RPC boxes 104") connected to corresponding ones of mesh radios 102(1)-102(3), and an ultra high frequency (UHF)/very high frequency (VHF) radio transmitter 106 operated by a user (not shown) who is local to the UHF/VHF radio transmitter. UHF/VHF radio transmitter 106 may be spaced-apart from mesh radios 102 and RPC boxes 104 by many miles depending on a transmit power of UHF/VHF radio transmitter 106 and terrain limitations. According to embodiments presented herein, each RPC box 104(i) (also referred to as an "RPC device") includes an environmentally-sealed ruggedized enclosure or case that carries batteries and control circuits configured to selectively provide battery power to (i.e., energize), or remove battery power from (i.e., deenergize), a corresponding mesh radio 102(i), responsive to a UHF/VHF radio signal transmitted by UHF/VHF radio transmitter 106, under control of the user. Each RPC box 104(i) is self-contained and self-powered (i.e., is powered by its own batteries). In this way, the user remotely controls RPC boxes 104 via the UHF/VHF radio signal to energize or deenergize mesh radios 102 connected to the RPC boxes. Mesh radios 102 and RPC boxes 104 may be operated remotely and may remain unattended over long periods of time, such as weeks and months.

In the above-described environment, an RPC box 104(i) selectively provides battery power to a mesh radio 102(i); however, the RPC box 104(i) may selectively provide battery power to any EUD (also referred to as an "external device") that is battery powered.

Figure 2A:
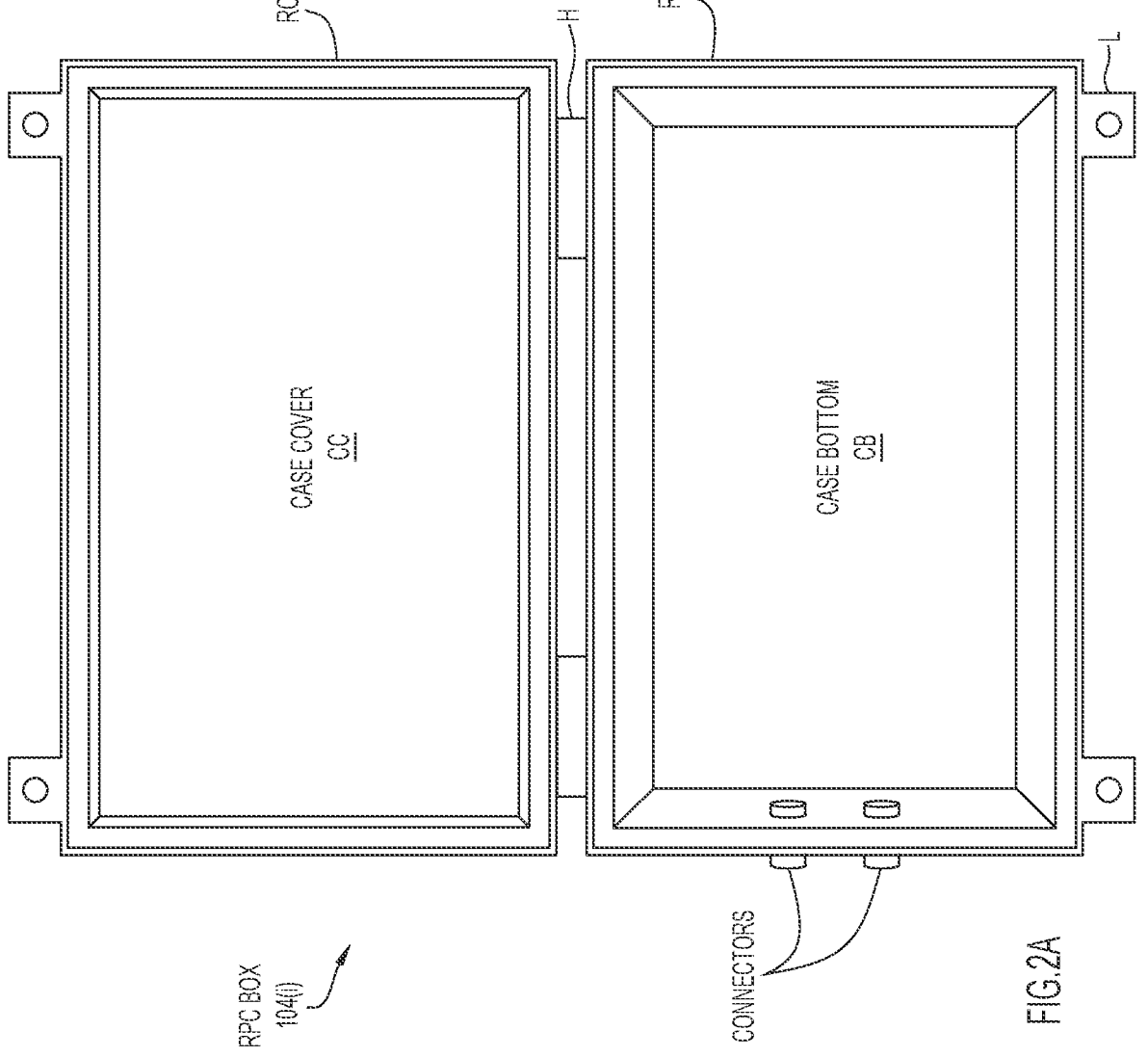
FIG. 2A is a perspective view of an RPC box when opened to expose interior electrical components, according to an embodiment.

FIG. 2A is a perspective view of each RPC box 104(i) according to an embodiment. RPC box 104(i) is constructed as a ruggedized case having a case bottom CB that is partially enclosed and a case cover CC pivotally attached to the case bottom with hinges H or the like. Case bottom CB and case cover CC have a ruggedized construction and may comprise a durable, waterproof, resilient material, such as metal, plastic, and the like. FIG. 2A shows RPC box 104(i) in an "open configuration" in which case cover CC occupies an open position that is lifted away from case bottom CB. The open position of case cover CC exposes and permits easy access to electrical components that are retained in a space defined by case bottom CB. Case bottom CB includes through-connectors to connect external electrical components to the electrical components retained in the case bottom. The aforementioned electrical components and connectors are described in detail below in connection with FIGS. 2B and 3.

Case cover CC is sized such that, when RPC box 104(i) is in a "closed configuration," a rim RC of case cover CC is brought into alignment and contact with a rim RB of case bottom CB, so as to enclose the RPC box fully and provide a sealed container (between the two rims) that protects the (internal) electrical components against external environmental conditions. Case cover CC may be latched to case bottom CB using a latch or lock mechanism L.

Figure 2B:
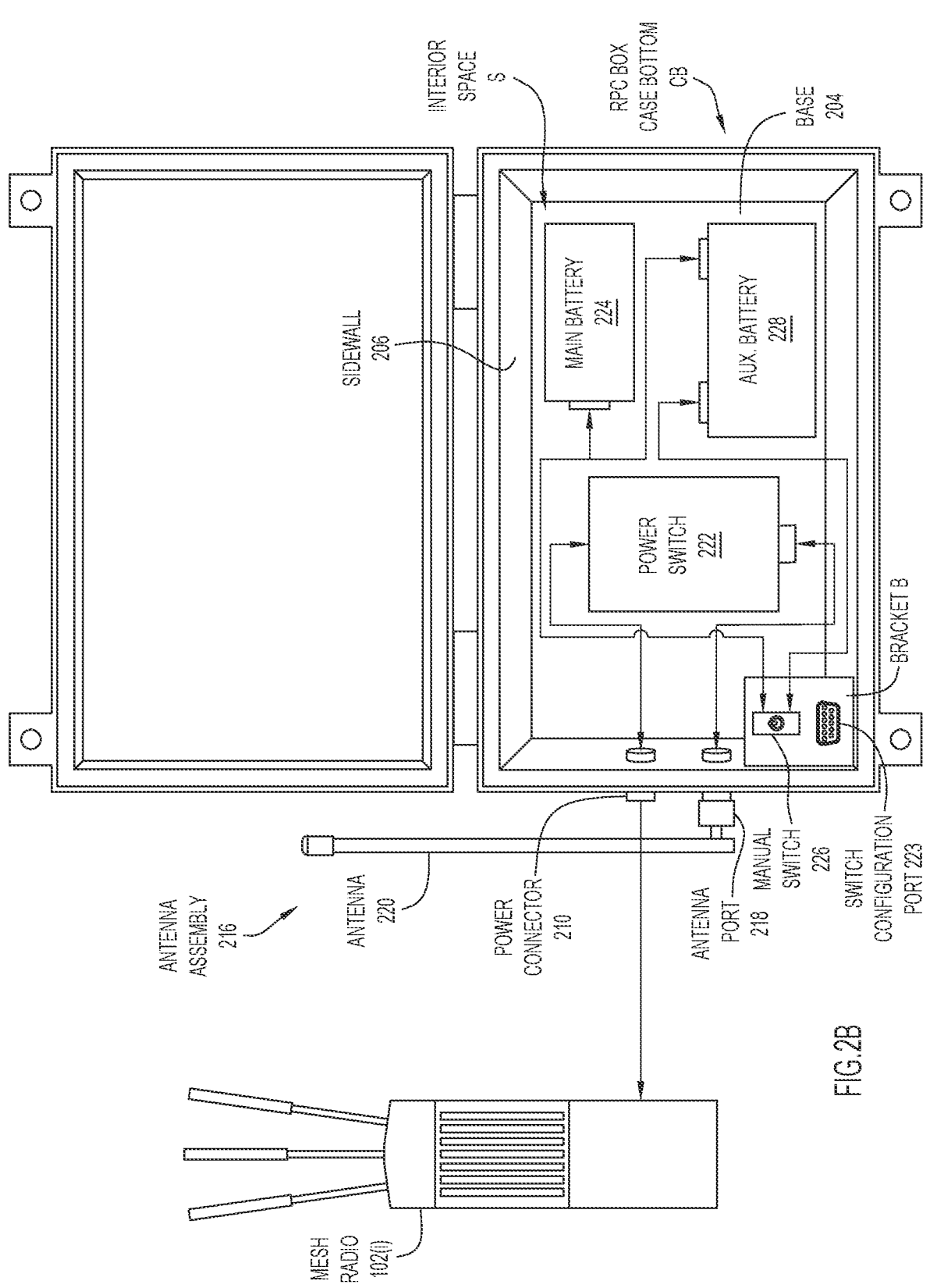
FIG. 2B is a perspective view of a case bottom of the RPC box from FIG. 2A.

FIG. 2B is a perspective view of case bottom CB from FIG. 2A. FIG. 2B shows some of the electrical components of RPC box 104(i), and also shows mesh radio 104(i) adjacent to case bottom CB. Case bottom CB has a base 204 that is flat and that is surrounded by a continuous sidewall 206 having a height that extends vertically upward from the base to define an interior volume or space S (also referred to as a "cavity" or "void") that is partially enclosed by the base and the sidewalls of the case bottom, as shown. The height of sidewall 206 terminates in rim RB. When RPC box 104(i) is in the closed configuration, the RPC box fully encloses space S. As shown, RPC box 104(i) includes the following electrical connector components mounted to and extending through sidewall 206 of case bottom CB: a power connector 210 configured to be connected to an EUD (e.g., mesh radio 102(i)) through a power cable (not shown); and an antenna assembly 216. Antenna assembly 216 includes an antenna port 218 mounted to and extending through case bottom CB, and an antenna 220 connected to the antenna port and extending away from the case bottom. Antenna 220 is an external antenna configure to receive a UHF/VHF radio signal and deliver the same into space S through antenna port 218. As used herein, the term "internal" means inside RPC box 104(i), i.e., positioned and/or retained in space S. Conversely, "external" means outside of RPC box 104(i), e.g., not inside or within space S.

RPC box 104(i) includes the following internal electrical components: a power switch 222 coupled to antenna port 218 and that is battery powered and radio controlled; a switch configuration port 223 through which the power switch may be programmed; a main battery 224 configured to provide main battery power to the EUD (e.g., mesh radio 102(i)) through the power switch and power connector 210; a manual switch 226; an auxiliary (AUX) battery 228 to supply auxiliary battery power to the power switch through the manual switch; and various electrical connections (e.g., electrically conductive wires, traces, and/or cables, depicted as bidirectional arrows in FIG. 2B) to interconnect the electrical connector components and the internal electrical components. In an embodiment in which main battery 224 also provides battery power to power switch 222, auxiliary battery 228 may be omitted. Switch configuration port 223 and manual switch 226 may be mounted to a bracket B (e.g., a sheet metal or plastic bracket) that is positioned inside of and fixed to base 204. In an example, power switch 222 may include a Ritron Teleswitch Relay, although other radio controlled relays may be used. In various examples, main battery 224 and auxiliary battery 228 may include rechargeable Lithium ion batteries that provide direct current (DC) voltages in a range of 12-30 Volts depending on the power requirements for mesh radio 102(i) and power switch 222, although other types of batteries and voltage ranges are possible. In another arrangement in which auxiliary battery 228 is omitted, main battery 224 may provide the auxiliary battery power to power switch 222. The aforementioned components and other components are described in further detail below in connection with FIG. 3.

Figure 3:
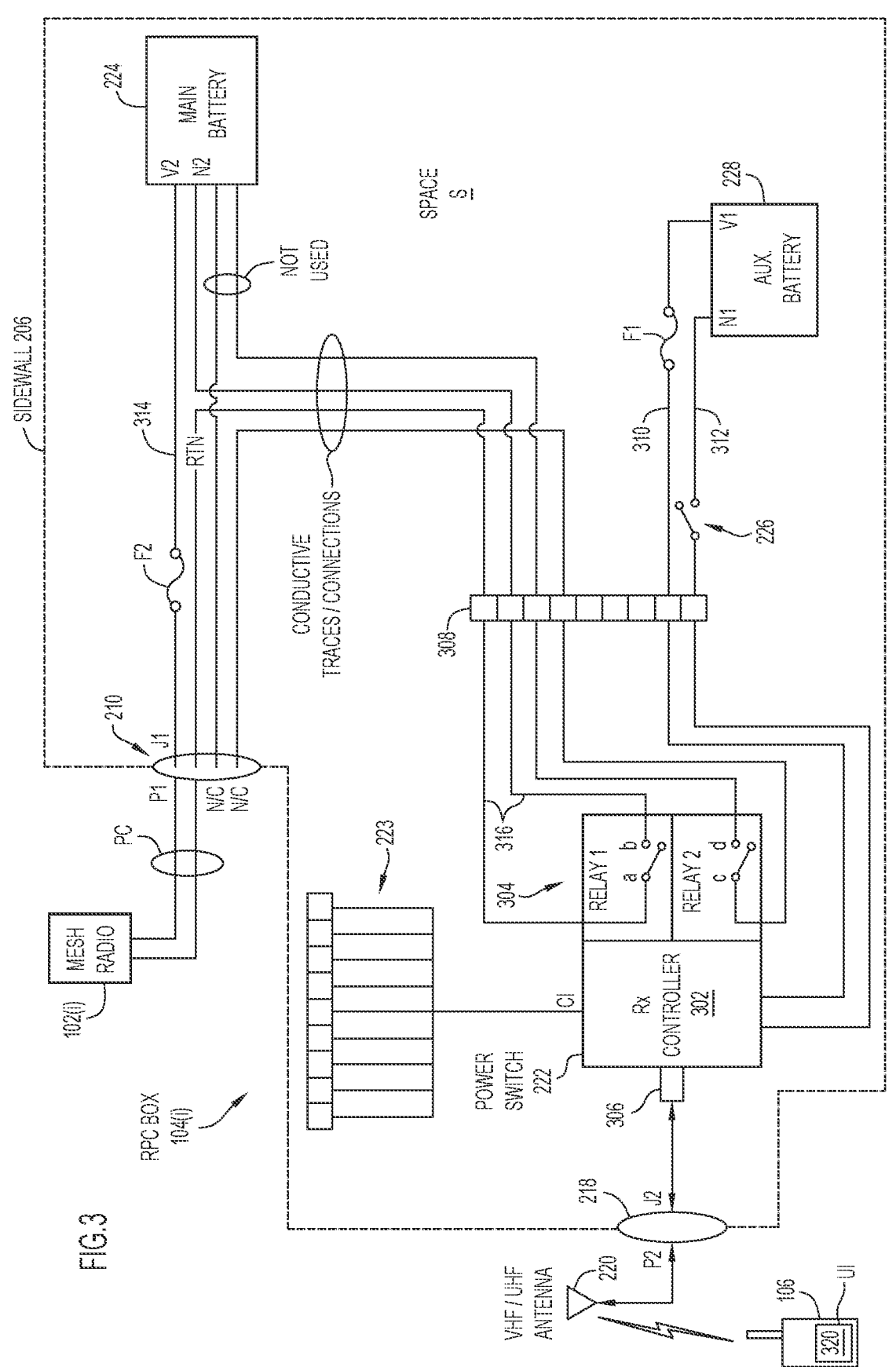
FIG. 3 is a circuit diagram for electrical components of the RPC box according to an embodiment.

FIG. 3 is a circuit diagram of RPC box 104(i) according to an embodiment. Power switch 222 includes receiver (Rx)-controller 302 having an RF port 306 to receive a UHF/VHF radio signal, and relays 304 (including a relay 1 and a relay 2) that are turned off/opened and turned on/closed under control of the receiver-controller. Relay 1 includes opposing relay terminals a, b and operates to connect the opposing relay terminals to each other when the relay is on/closed, and disconnect the opposing relay terminals from each other when the relay is off/opened. Similarly, relay 2 includes opposing relay terminals c, d and operates to connect the opposing relay terminals to each other when the relay is on/closed, and disconnect the opposing relay terminals from each other when the relay is off/opened. In FIG. 3, both relays are shown off/opened. While relay 2 is not used in the example of FIG. 3, other arrangements may use both relay 1 and relay 2.

Antenna 220 receives a UHF/VHF radio signal modulated to convey switch control commands for controlling relays 304, and delivers the UHF/VHF radio signal to RF port 306 through antenna port 218, which includes an external plug-side P2 (i.e., a connector side that is external to case bottom CB) connected to the antenna, and an internal jack-side J2 (i.e., a connector side that is internal to case bottom CB) connected to the RF port. When power switch 222 is powered-on, receiver-controller 302 receives the UHF/VHF radio signal delivered by antenna 220, recovers/demodulates the switch control commands from the UHF/VHF radio signal, and compels relays 304 to open and/or close responsive to the switch control commands.

In an example, the switch control commands may be configured as respective sets of dual-tone multi-frequency (DTMF) tones that represent DTMF codes that control relays 304 in pre-programmed ways. Examples of the DTMF codes and their corresponding relay control actions include the following:

a. DTMF code 1, 2, 3=only relay 2 on (i.e., relay 1 open, relay 2 closed).
 b. DTMF code 4, 5, 6=only relay 1 on (i.e., relay 1 closed, relay 2 open).
 c. DTMF code 7, 8, 9=toggle both relays. Toggle compels each relay from a current position (e.g., closed/open) that exists when the toggle is received, to an opposite position (e.g., open/closed).

RPC box 104(i) also includes switch configuration port 223. Switch configuration port 223 is connected to a configuration input CI of power switch 222, to enable a user of an external computer, connected to the switch configuration port, to configure/program the power switch. For example, through switch configuration port 223, a user may program power switch 222 to respond to particular DTMF codes in particular ways. In other examples, other types of switch control commands (i.e., switch control commands other than DTMF tones) may be used.

Auxiliary battery 228 provides auxiliary battery power to power switch 222. A positive terminal V1 of auxiliary battery 228 is connected to a power input of power switch 222 through a conductive path 310 including a fuse F1 and an internal connector 308. In addition, a negative terminal N1 of auxiliary battery 228 is selectively connected to the power input of power switch 222 through a conductive path 312 that includes manual switch 226 and internal connector 308. In an example, manual switch 226 includes a manual two-position toggle switch. When manual switch 226 is closed, both positive and negative terminals N1, V1 of auxiliary battery 228 are connected to power switch 222 and thus provide auxiliary battery power to the power switch, which powers-on the power switch. On the other hand, when manual switch 226 is opened, negative terminal N1 of auxiliary battery 228 is disconnected from power switch 222, which interrupts the auxiliary battery power, and turns-off the power switch.

Main battery 224 selectively provides main battery power to mesh radio 102(i) through power switch 222 and power connector 210 in the following manner. Power connector 210 includes an internal jack-side J1 (i.e., a power connector side that is inside case bottom CB) and an external plug-side P1 (i.e., a power connector side that is external to case bottom CB) that can be connected to a power input of mesh radio 102(i) through an external power cable PC. A conductive path 314 (e.g., including wires and/or conductive traces) directly connects a positive terminal V2 of main battery 224 to a voltage pin of internal jack-side J1 of power connector 210 through an inline fuse F2, without including a relay of power switch 222 in the conductive path. Additionally, a (conductive) return path 316 selectively connects a negative terminal N2 of main battery 224 to a return pin of internal jack-side J1 of power connector 210 through internal connector 308 and relay 1, as shown and described below. In FIG. 3, battery terminals V2, N2 are shown connected to additional pins of power connector 210, which are not connected (N/C) in the embodiments shown; however, in other embodiments, the additional pins may support connection to an additional external device, to which battery power may be supplied through relay 2.

When relay 1 is closed, relay 1 completes or closes return path 316 from negative terminal N2 to the return pin of power connector 210. Thus, the main battery power flows from positive terminal V2 of the main battery to mesh radio 102(i) through power connector 210, and returns from the mesh radio to negative terminal N2 of the main battery through the power connector and the closed relay 1. On the other hand, when relay 1 is open/opened, return path 316 is an open circuit, which prevents the main battery power from powering mesh relay 102(i). In another arrangement, power switch 222 may be connected in-line with positive terminal V2 instead of negative terminal N2; however, connecting the power switch to the negative/return terminal is safer, and reduces the possibility of short circuits to the positive terminal that might otherwise occur, and which can cause over-current damage to main battery 224. In yet another arrangement, positive terminal V2 and negative terminal N2 may be connected through respective relays of power switch 222; however, provided that at least one of the battery terminals is connected through a relay of the power switch, the desired selective connection to power connector 210 can be achieved. In another arrangement, multiple voltage pins of power connector 210 may be tied together to provide a combined battery voltage to mesh radio 102(i) (or other EUD).

UHF/VHF radio transmitter 106 is configured with switch control commands (e.g., the DTMF codes) used to control power switch 222. The switch control commands may be configured to open, close, and toggle, power switch 222 to supply or not supply battery power to mesh radio 102(i) in the manner described above. UHF/VHF radio transmitter 106 includes a user interface (UI) 320 (e.g., a display, keypad, and the like), connected to a controller (not shown) of the UHF/VHF radio transmitter, and through which a user interacts with and controls the UHF radio transmitter. Through UI 320, the user may select a particular switch control command, and trigger the UHF/VHF radio transmitter 106 to transmit a UHF/VHF radio signal modulated with the particular switch control command. As described, upon receiving the UHF/VHF radio signal, RPC box 104(i) controls power switch 222 to either supply main battery power to, or remove the main battery power from, mesh radio 102(i).

FIG. 4 is a flowchart of an example method 400 of using an RPC device (e.g., RPC box 104(1)) to selectively provide battery power to an external device (e.g., mesh radio 102(1)) that can be battery powered.

402 includes providing the RPC device. The RPC device includes a power connector connected to an external device, a power switch configured to be controlled responsive to commands in a UHF/VHF radio signal received by the power switch, and a battery having battery terminals connected to the power connector such that at least one of the battery terminals is connected to the power connector through the power switch. The RPC device further includes an antenna to receive, and deliver to the power switch, the UHF/VHF radio signal.

404 includes, upon receiving the UHF/VHF radio signal to include a first command of the commands, closing the power switch to supply battery power from the battery to power the external device.

406 includes, upon receiving the UHF/VHF radio signal to include a second command of the commands, opening the power switch to interrupt the battery power.

In summary, in some aspects, the techniques described herein relate to an apparatus including: a case enclosing a space; a power connector, extending through the case, to be connected to an external device; a power switch, retained in the space, and configured to be controlled responsive to commands in a UHF/VHF radio signal received by the power switch; a battery, retained in the space, having battery terminals connected to the power connector such that at least one of the battery terminals is connected to the power connector through the power switch; and an antenna, mounted to the case, to receive, and deliver to the power switch, the UHF/VHF radio signal, wherein the commands include a first command to close the power switch to connect the battery to the external device, and a second command to open the power switch to disconnect the battery from the external device.

In some aspects, the techniques described herein relate to an apparatus, wherein: the battery terminals include a positive terminal directly connected to the power connector; and the battery terminals include a negative terminal connected to the power connector through the power switch, such that when the power switch is closed, the negative terminal and the positive terminal are connected to the power connector, and when the power switch is open, the negative terminal is disconnected from the power connector.

In some aspects, the techniques described herein relate to an apparatus, wherein the power connector extends through the case and includes: a first connector side external to the case and configured to connect to the external device; and a second connector side internal to the case and connected to the battery and the power switch.

In some aspects, the techniques described herein relate to an apparatus, wherein the case includes: a case bottom that defines and partially encloses the space; and a case cover sized and configured to have an open position to permit access to the space, and a closed position in which the case cover contacts the case bottom and fully encloses, and environmentally seals, the space.

In some aspects, the techniques described herein relate to an apparatus, further including: an auxiliary battery, retained in the space, having auxiliary battery terminals connected to a power input of the power switch to provide auxiliary battery power to the power switch.

In some aspects, the techniques described herein relate to an apparatus, further including: a manual switch retained in the space, wherein one of the auxiliary battery terminals is connected to the power input of the power switch through the manual switch, such that when the manual switch is closed, both of the auxiliary battery terminals are connected to the power input of the power switch and supply the auxiliary battery power to the power switch, and when the manual switch is open, only one of the auxiliary battery terminals is connected to the power input of the power switch to interrupt the auxiliary battery power.

In some aspects, the techniques described herein relate to an apparatus, further including: a power switch configuration port connected to a configuration input of the power switch and through which the power switch is programmed to be responsive to the commands.

In some aspects, the techniques described herein relate to an apparatus, wherein: the commands include first and second sets of dual-tone multi-frequency (DTMF) tones configured to close and open the power switch, respectively.

In some aspects, the techniques described herein relate to a system including: an external device that is battery powered; a remote power control device connected to the external device and including: a power switch configured to be opened and closed responsive to commands in a UHF/VHF radio signal received by the power switch; a battery that is connected to the external device through the power switch; and an antenna to receive, and deliver to the power switch, the UHF/VHF radio signal, wherein when the power switch is opened and closed, the battery provides battery power, and does not provide the battery power, to the external device; and a radio to transmit the UHF/VHF radio signal to the remote power control device to control when the remote power control device provides the battery power to, or does not provide the battery power to, the external device.

In some aspects, the techniques described herein relate to a system, wherein the remote power control device further includes: a case enclosing a space; and a power connector extending through the case and configured to be connected to the external device; wherein the antenna is mounted to the case, the battery is retained in the space, and the battery includes battery terminals connected to the power connector such that at least one of the battery terminals is connected to the power connector through the power switch.

In some aspects, the techniques described herein relate to a system, wherein: the battery terminals include a positive terminal directly connected to the power connector; and the battery terminals include a negative terminal connected to the power connector through the power switch, such that when the power switch is closed, the negative terminal and the positive terminal are connected to the power connector, and when the power switch is open, the negative terminal is disconnected from the power connector.

In some aspects, the techniques described herein relate to a system, wherein the power connector extends through the case and includes: a first connector side external to the case and configured to connect to the external device; and a second connector side internal to the case and connected to the battery and the power switch.

In some aspects, the techniques described herein relate to a system, wherein the case includes: a case bottom that defines and partially encloses the space; and a case cover sized and configured to have an open position to permit access to the space, and a closed position in which the case cover contacts the case bottom and fully encloses, and environmentally seals, the space.

In some aspects, the techniques described herein relate to a system, wherein the remote power control device further includes: an auxiliary battery, retained in the space, having auxiliary battery terminals connected to a power input of the power switch to provide auxiliary battery power to the power switch.

In some aspects, the techniques described herein relate to a system, wherein the remote power control device further includes: a manual switch retained in the space, wherein one of the auxiliary battery terminals is connected to the power input of the power switch through the manual switch, such that when the manual switch is closed, both of the auxiliary battery terminals are connected to the power input of the power switch and supply the auxiliary battery power to the power switch, and when the manual switch is open, only one of the auxiliary battery terminals is connected to the power input of the power switch to interrupt the auxiliary battery power.

In some aspects, the techniques described herein relate to a system, wherein the remote power control device further includes: a power switch configuration port connected to a configuration input of the power switch and through which the power switch is programmed to be responsive to the commands.

In some aspects, the techniques described herein relate to a system, wherein: the commands include first and second sets of dual-tone multi-frequency (DTMF) tones configured to close and open the power switch, respectively.

In some aspects, the techniques described herein relate to a method including: providing a remote power control device including: a power connector connected to an external device; a power switch configured to be controlled responsive to commands in a UHF/VHF radio signal received by the power switch; a battery having battery terminals connected to the power connector such that at least one of the battery terminals is connected to the power connector through the power switch; and an antenna to receive, and deliver to the power switch, the UHF/VHF radio signal; and upon receiving the UHF/VHF radio signal to include a first command of the commands, closing the power switch to supply battery power from the battery to power the external device.

In some aspects, the techniques described herein relate to a method, further including: upon receiving the UHF/VHF radio signal to include a second command of the commands, opening the power switch to interrupt the battery power.

In some aspects, the techniques described herein relate to a method, wherein: the commands include first and second sets of dual-tone multi-frequency (DTMF) tones configured to close and open the power switch, respectively.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. An apparatus comprising:
a case enclosing a space;
a power connector, extending through the case, to be connected to an external device;
a power switch, retained in the space, and configured to be controlled responsive to commands in a UHF/VHF radio signal received by the power switch;
a battery, retained in the space, having battery terminals connected to the power connector such that at least one of the battery terminals is connected to the power connector through the power switch;
a manual switch retained in the space;

an auxiliary battery retained in the space and having auxiliary battery terminals connected to a power input of the power switch through the manual switch, such that when the manual switch is closed, the auxiliary battery supplies auxiliary battery power to the power switch, and when the manual switch is open, the manual switch interrupts the auxiliary battery power from the power input; and an antenna, mounted to the case, to receive, and deliver to the power switch, the UHF/VHF radio signal, wherein the commands include a first command to close the power switch to connect the battery to the external device, and a second command to open the power switch to disconnect the battery from the external device.

2. The apparatus of claim 1, wherein:

the battery terminals include a positive terminal directly connected to the power connector; and the battery terminals include a negative terminal connected to the power connector through the power switch, such that when the power switch is closed, the negative terminal and the positive terminal are connected to the power connector, and when the power switch is open, the negative terminal is disconnected from the power connector.

3. The apparatus of claim 2, wherein the power connector extends through the case and includes:

a first connector side external to the case and configured to connect to the external device; and a second connector side internal to the case and connected to the battery and the power switch.

4. The apparatus of claim 1, wherein the case includes:

a case bottom that defines and partially encloses the space; and a case cover sized and configured to have an open position to permit access to the space, and a closed position in which the case cover contacts the case bottom and fully encloses, and environmentally seals, the space.

5. The apparatus of claim 1, wherein:

one of the auxiliary battery terminals is connected to the power input of the power switch through the manual switch, such that when the manual switch is closed, the auxiliary battery terminals are connected to the power input of the power switch and supply the auxiliary battery power to the power switch, and when the manual switch is open, only one of the auxiliary battery terminals is connected to the power input of the power switch to interrupt the auxiliary battery power.

6. The apparatus of claim 1, further comprising:

a power switch configuration port connected to a configuration input of the power switch and through which the power switch is programmed to be responsive to the commands.

7. The apparatus of claim 1, wherein:

the commands include first and second sets of dual-tone multi-frequency (DTMF) tones configured to close and open the power switch, respectively.

8. A system comprising:

an external device that is battery powered;

a remote power control device connected to the external device and including:

a power switch configured to be opened and closed responsive to commands in a UHF/VHF radio signal received by the power switch;

a battery that is connected to the external device through the power switch;

an auxiliary battery having auxiliary battery terminals connected to a power input of the power switch through a manual switch, such that when the manual switch is closed, the auxiliary battery supplies auxiliary battery power to the power switch, and when the manual switch is open, the manual switch interrupts the auxiliary battery power from the power input; and an antenna to receive, and deliver to the power switch, the UHF/VHF radio signal, wherein when the power switch is opened and closed, the battery provides battery power, and does not provide the battery power, to the external device; and a radio to transmit the UHF/VHF radio signal to the remote power control device to control when the remote power control device provides the battery power to, or does not provide the battery power to, the external device.

9. The system of claim 8, wherein the remote power control device further includes:

a case enclosing a space; and a power connector extending through the case and configured to be connected to the external device;

wherein the antenna is mounted to the case, the battery is retained in the space, and the battery includes battery terminals connected to the power connector such that at least one of the battery terminals is connected to the power connector through the power switch.

10. The system of claim 9, wherein:

the battery terminals include a positive terminal directly connected to the power connector; and the battery terminals include a negative terminal connected to the power connector through the power switch, such that when the power switch is closed, the negative terminal and the positive terminal are connected to the power connector, and when the power switch is open, the negative terminal is disconnected from the power connector.

11. The system of claim 10, wherein the power connector extends through the case and includes:

a first connector side external to the case and configured to connect to the external device; and a second connector side internal to the case and connected to the battery and the power switch.

12. The system of claim 9, wherein the case includes:

a case bottom that defines and partially encloses the space; and a case cover sized and configured to have an open position to permit access to the space, and a closed position in which the case cover contacts the case bottom and fully encloses, and environmentally seals, the space.

13. The system of claim 9, wherein:

one of the auxiliary battery terminals is connected to the power input of the power switch through the manual switch, such that when the manual switch is closed, the auxiliary battery terminals are connected to the power input of the power switch and supply the auxiliary battery power to the power switch, and when the manual switch is open, only one of the auxiliary battery terminals is connected to the power input of the power switch to interrupt the auxiliary battery power.

14. The system of claim 8, wherein the remote power control device further includes:

a power switch configuration port connected to a configuration input of the power switch and through which the power switch is programmed to be responsive to the commands.

15. The system of claim 8, wherein:

the commands include first and second sets of dual-tone multi-frequency (DTMF) tones configured to close and open the power switch, respectively.

16. A method comprising:

providing a remote power control device comprising:

a power connector connected to an external device;

a power switch configured to be controlled responsive to commands in a UHF/VHF radio signal received by the power switch;

a battery having battery terminals connected to the power connector such that at least one of the battery terminals is connected to the power connector through the power switch;

an auxiliary battery having auxiliary battery terminals connected to a power input of the power switch through a manual switch, such that when the manual switch is closed, the auxiliary battery supplies auxiliary battery power to the power switch, and when the manual switch is open, the manual switch interrupts the auxiliary battery power from the power input; and an antenna to receive, and deliver to the power switch, the UHF/VHF radio signal; and upon receiving the UHF/VHF radio signal to include a first command of the commands, closing the power switch to supply battery power from the battery to power the external device.

17. The method of claim 16, further comprising:

upon receiving the UHF/VHF radio signal to include a second command of the commands, opening the power switch to interrupt the battery power.

18. The method of claim 16, wherein:

the commands include first and second sets of dual-tone multi-frequency (DTMF) tones configured to close and open the power switch, respectively.

*    *    *    *    *